(12) United States Patent
Shiroishi et al.

(10) Patent No.: US 8,520,372 B2
(45) Date of Patent: Aug. 27, 2013

(54) ELECTRONIC APPARATUS DISPLAY HOUSING ASSEMBLY

(75) Inventors: Toshikazu Shiroishi, Hamura (JP); Takayuki Arisaka, Fussa (JP); Yasuyuki Suzuki, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 329 days.

(21) Appl. No.: 12/972,250

(22) Filed: Dec. 17, 2010

(65) Prior Publication Data
US 2011/0286161 A1  Nov. 24, 2011

(30) Foreign Application Priority Data
May 21, 2010  (JP) .................................. 2010-117602

(51) Int. Cl.
*G06F 1/16* (2006.01)
(52) U.S. Cl.
USPC .................................................. 361/679.02
(58) Field of Classification Search
USPC ........................................ 361/679.01, 679.02
See application file for complete search history.

(56) References Cited

U.S. PATENT DOCUMENTS

| | | | |
|---|---|---|---|
| 7,542,274 B2 * | 6/2009 | Minaguchi et al. | 361/679.55 |
| 7,710,728 B2 * | 5/2010 | Arisaka et al. | 361/679.55 |
| 8,320,109 B2 * | 11/2012 | Tamura et al. | 361/679.01 |
| 2010/0182737 A1 | 7/2010 | Tani et al. | |
| 2010/0258626 A1 * | 10/2010 | Watanabe et al. | 361/679.01 |

FOREIGN PATENT DOCUMENTS

| | | |
|---|---|---|
| JP | 05-124060 A | 5/1993 |
| JP | 10-264187 A | 10/1998 |
| JP | 2001-332878 A1 | 11/2001 |
| JP | 2002-118371 A1 | 4/2002 |
| JP | 2006-001078 A | 1/2006 |
| JP | 2008-053647 A1 | 3/2008 |
| JP | 2008-288513 A1 | 11/2008 |
| JP | 2010-165947 A1 | 7/2010 |

OTHER PUBLICATIONS

Notice of Reasons for Rejection mailed by Japan Patent Office on Mar. 1, 2011 in the corresponding Japanese patent application No. 2010-117602.

* cited by examiner

*Primary Examiner* — Lisa Lea Edmonds
(74) *Attorney, Agent, or Firm* — Knobbe Martens Olson & Bear, LLP

(57) ABSTRACT

According to one embodiment, an electronic apparatus comprises a first case includes a screw hole, a second case separated from the first case, and a screw passing through the screw hole to fix the second case to the first case. The first case comprises a metallic portion includes an opening portion, a resin portion formed integrally with the metallic portion so as to cover the opening portion, a protrusion extending from the metallic portion to be arranged on the resin portion in a thickness direction, and a sheet-type block located between the protrusion and resin portion. The protrusion comprises an opening formed in a surface opposed to the resin part, and the screw hole extending from the opening to pass through the protrusion in the thickness direction, and the block covers the opening.

10 Claims, 9 Drawing Sheets

ELECTRONIC APPARATUS DISPLAY HOUSING ASSEMBLY

REFERENCE TO RELATED APPLICATIONS

This application is based upon and claims the benefit of priority from Japanese Patent Application No. 2010-117602, filed May 21, 2010; the entire contents of which are incorporated herein by reference.

FIELD

Embodiments described herein relate generally to an electronic apparatus comprising a housing formed by integrating a metal part with a resin portion into one body.

BACKGROUND

In an electronic apparatus, such as a notebook personal computer, a mobile phone, or a portable music player, a resin is used as a material of a housing for weight saving, aesthetics, and insulation purposes. Further, to achieve better strength than a housing made of a resin only, a housing is often made by integrating a metal and a resin.

In contrast, an electronic apparatus in demand on the market is smaller, thinner and lighter. Therefore, there is always a demand for size reduction of this type of electronic apparatus, and there is a certain need for a technique that realizes a smaller housing.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic apparatus comprises: a first case comprising a screw hole; a second case separated from the first case; and a screw passing through the screw hole to fix the second case to the first case. The first case comprises: a metallic portion comprising an opening portion; a resin portion formed integrally with the metallic portion so as to cover the opening portion; a protrusion extending from the metallic portion to be arranged on the resin portion in a thickness direction; and a sheet-type block located between the protrusion and resin portion. The protrusion comprises an opening formed in a surface opposed to the resin part, and the screw hole extending from the opening to pass through the protrusion in the thickness direction, and the block covers the opening.

Referring to FIGS. 1 to 6, a first embodiment of an electronic apparatus will be described below. In this specification, the near side to the user (that is, user side) is defined as front F, the far side from the user is rear R, the left-hand side of the user is left, the right-hand side of the user is right, the upper side from the user's position is up and the lower side from the user's position is down.

Figure 1:
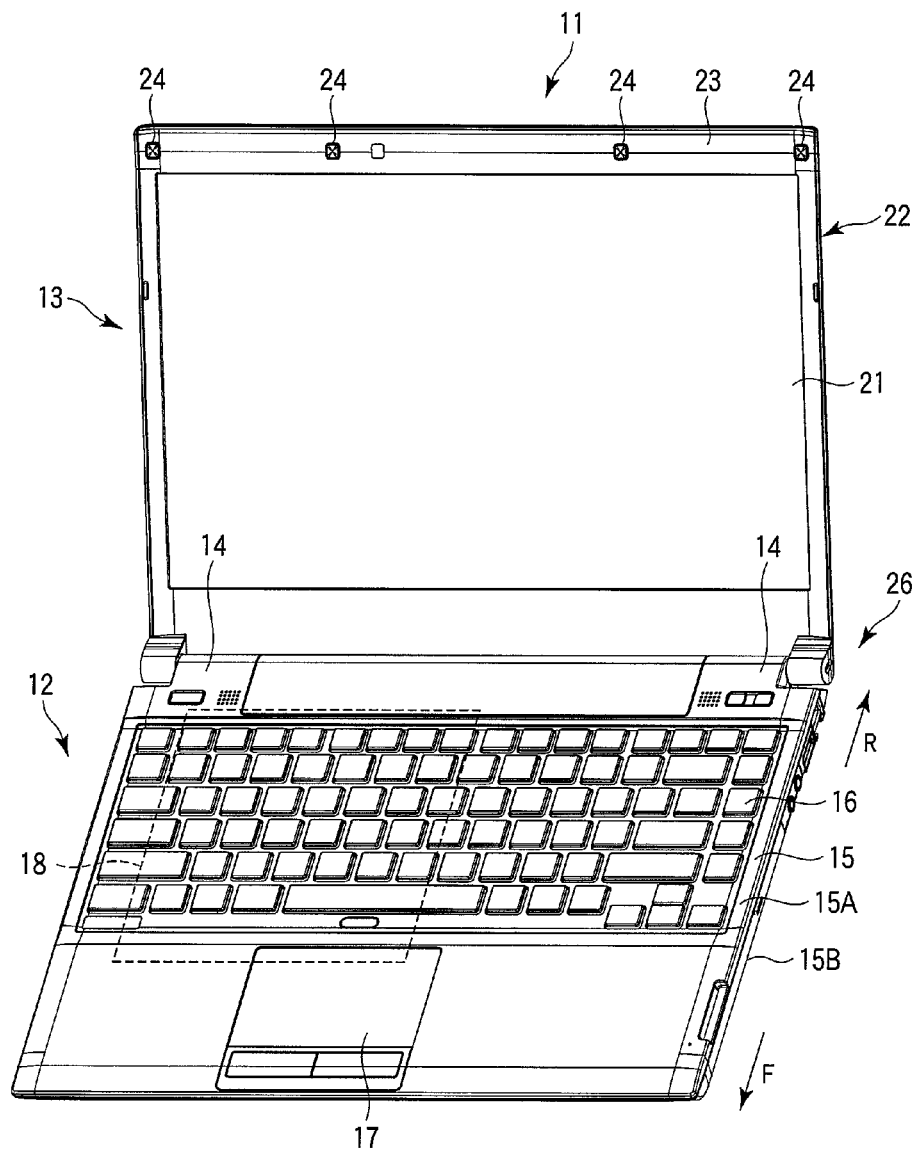
FIG. 1 is an exemplary perspective view of a portable computer which is an example of an electronic apparatus of a first embodiment.

As shown in FIG. 1, a portable computer 11, which is an example of the electronic apparatus, comprises a main body 12 and a display unit 13. The main body 12 comprises a hinge 14, and the hinge 14 rotatably supports the display unit 13.

Figure 2:
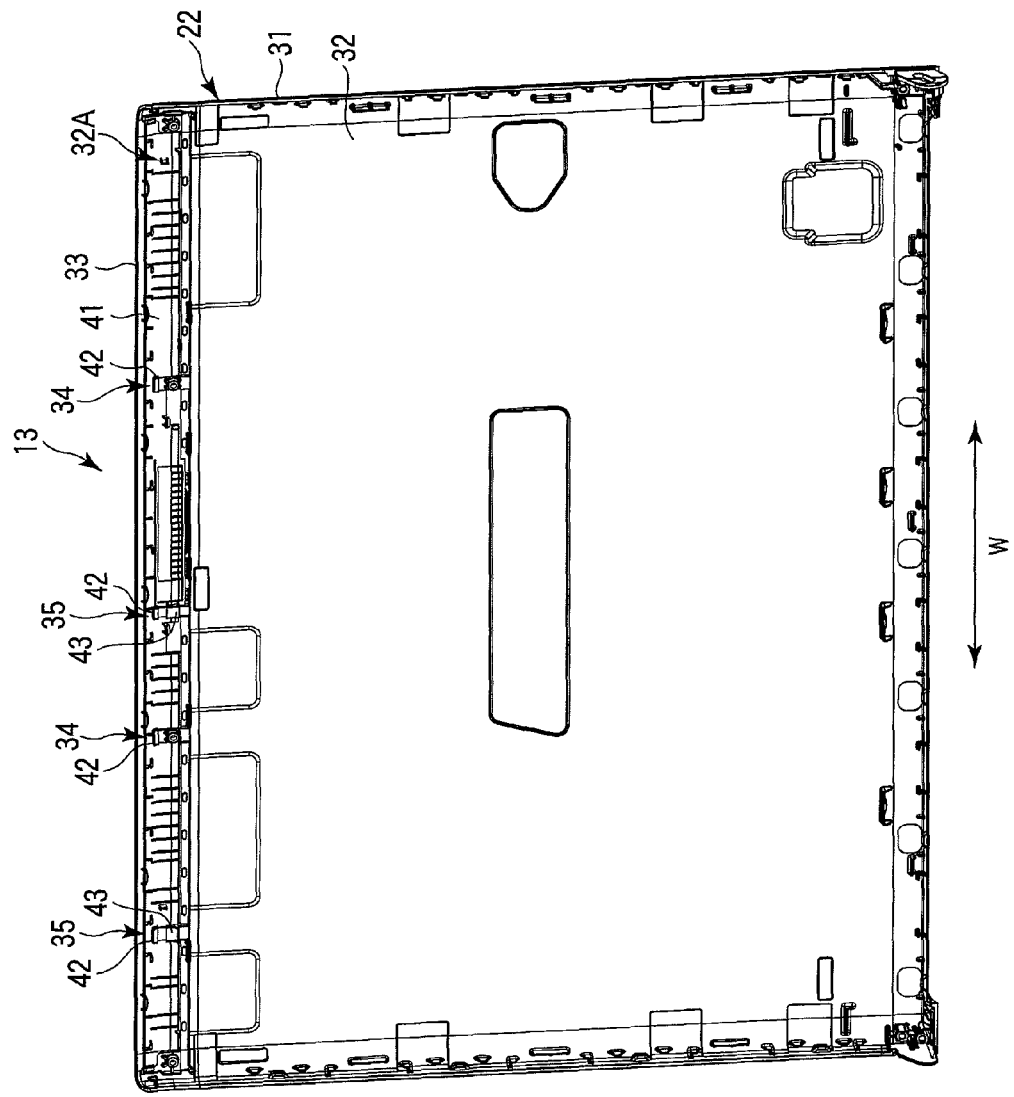
FIG. 2 is an exemplary perspective view of the inside of a cover of the portable computer shown in FIG. 1.

As shown in FIGS. 1 and 2, the main body 12 comprises a box-shaped main body cabinet 15 made of a metal such as a magnesium alloy, a keyboard 16 attached to an top surface of the main body cabinet 15, a touch pad 17 provided on the top surface of the main body cabinet 15, and a printed wiring board 18 contained in the main body cabinet 15. The printed wiring board 18 comprises circuit components such as a CPU, RAM and ROM, and correctively controls the whole portable computer 11. The main body cabinet 15 comprises an upper case 15A which forms the upper half of the main body cabinet 15 and to which the keyboard 16 is fixed and a lower case 15B which forms the lower half of the main body cabinet 15.

The display unit 13 comprises a display 21, a plastic display cabinet 22 surrounding the periphery of the display 21, and a plurality of cushions 24 attached to a mask 23 of the display cabinet 22. The display 21 is, for example, a liquid crystal display in the present embodiment, but may be another type of display panel.

Figure 5:
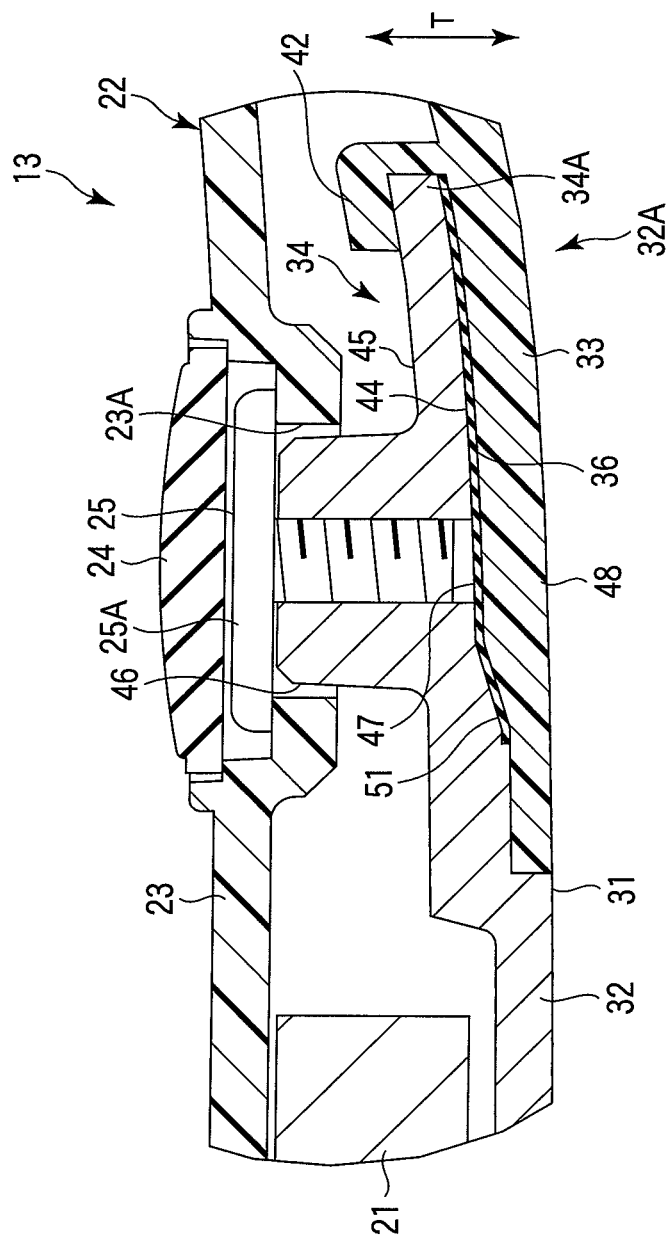
FIG. 5 is an exemplary cross-sectional view of the cover and mask shown in FIG. 3 taken along line F5-F5.

As shown in FIGS. 1 and 5, the cushions 24 are made of an elastic material such as rubber. The cushions 24 are fixed to the mask 23, which is a second case of the display cabinet 22, at positions corresponding to heads 25A of screws 25 described later. The cushions 24 are configured to strike the main body 12 when the display unit 13 is rotated to a position in which the display unit 13 covers the main body 12, i.e., a position in which the mask 23 is opposed to the main body 12. In the present embodiment, the main body cabinet 15 and the display cabinet 22 form a housing 26.

As shown in FIG. 5, the display cabinet 22 comprises a cover 31 which is a first case covering a back surface of the display 21, a mask 23, which is a second case covering a front surface of the display 21, and a screw 25 for fixing the mask 23 to the cover 31. The mask 23 is provided separately from the cover 31, and made of, for example, plastic to take a flat frame form. As shown in FIG. 5, the mask 23 comprises a through-hole 23A through which a boss 46 (described later) of the cover 31 and the screw 25 pass.

As shown in FIG. 2, the cover 31 is formed by integrally providing synthetic resin on part of a metallic base, and takes a plate form as a whole. That is to say, as shown in FIGS. 2 and 5, the cover 31 comprises a metallic portion 32 in which an opening portion 32A is provided, a resin portion 33 provided integrally with the metallic portion 32 to cover the opening portion 32A, a first protrusion 34 and second protrusion 35 extending from the metallic portion 32 to the resin portion 33, and a sheet-like block 36 made to adhere to the first protrusion 34. The metallic portion 32 is made, for example, of magnesium alloy, but may be made of another metallic material.

Figure 3:
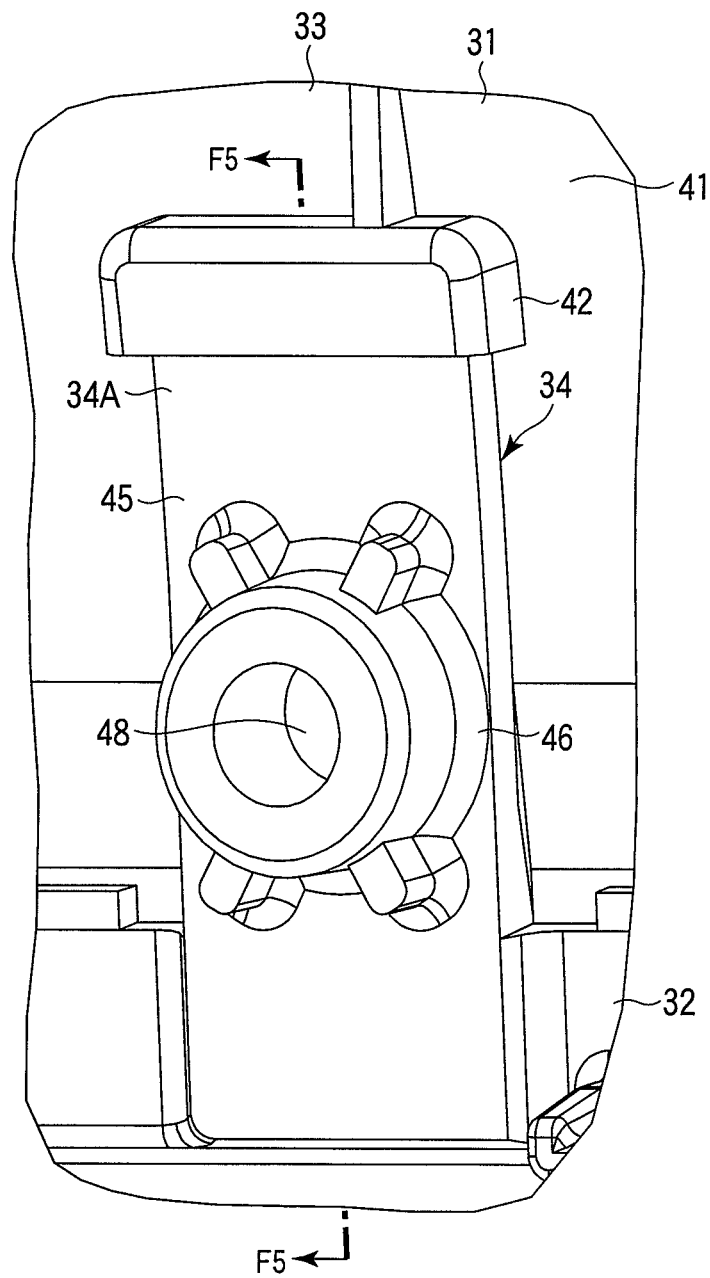
FIG. 3 is an exemplary enlarged perspective view of the vicinity of a first protrusion of the cover shown in FIG. 2.
Figure 6:
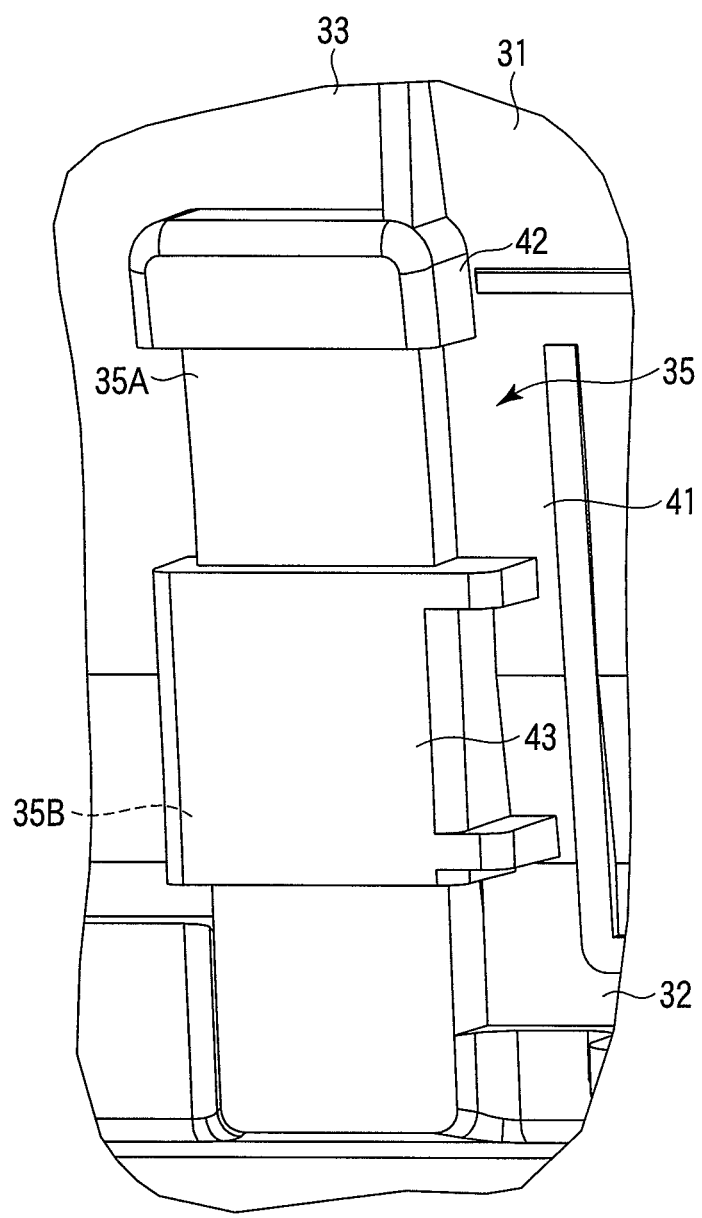
FIG. 6 is an exemplary perspective view of a second protrusion shown in FIG. 2, in which the second protrusion is viewed from a side opposite to a resin portion side.

The resin portion 33 is an antenna cover. On the inside of the resin portion 33, a plurality of antennas are provided. The resin portion 33 is formed integrally with the metallic portion 32 by insert molding using the metallic portion 32 as an insert. The resin portion 33 is made of a synthetic resin material. As shown in FIGS. 2, 3 and 6, the resin portion 33 comprises a main portion 41, a plurality of first holders 42 protruding from the main portion 41, and a plurality of second holders 43 protruding from the main portion 41. Each of the first holders 42 protrudes from the main portion 41 to surround a first end 34A of the first protrusion 34 or a second end 35A of the second protrusion 35. Each first holder 42 forms a bag shape together with the main portion 41.

Each of the second holders 43 protrudes from the main portion 41 to surround the vicinity of a second base 35B opposite to the second end 35A of the second protrusion 35. Each second holder 43 forms a tubular shape together with the main portion 41.

Figure 4:
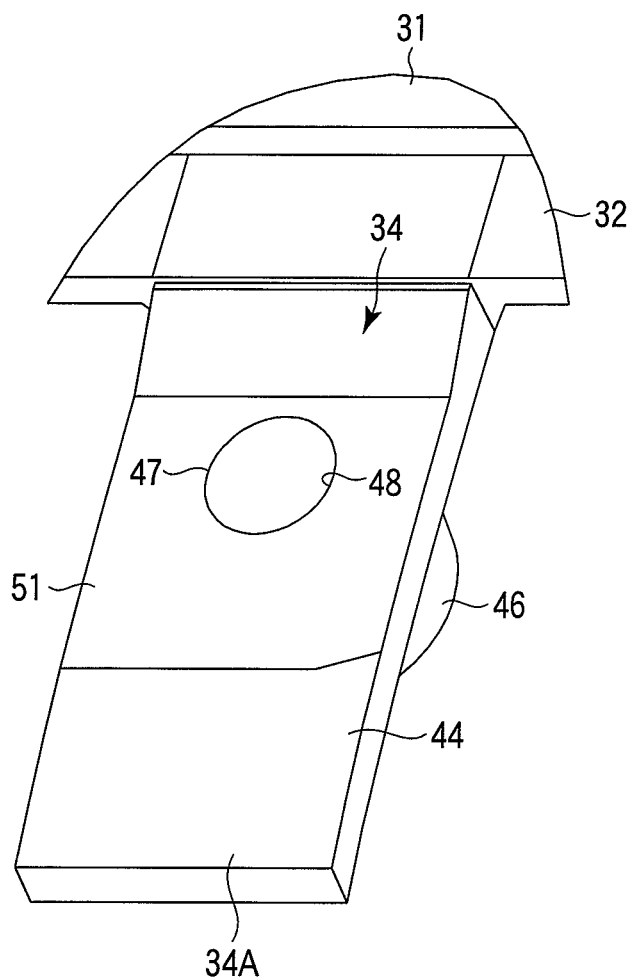
FIG. 4 is an exemplary perspective view of the first protrusion shown in FIG. 3, in which the first protrusion is viewed from a side opposite to a resin portion side.

As shown in FIG. 3, the first protrusion 34 is formed integrally with the metallic portion 32, and is a small piece protruding toward the resin portion 33. As shown in FIG. 5, the first protrusion 34 is arranged on the resin portion 33 in a thickness direction T of the resin portion 33. As shown in FIGS. 3 and 5, the first protrusion 34 comprises a boss 46 on a surface 45 opposite to a surface 44 opposed to (facing) the resin portion 33. As shown in FIGS. 4 and 5, the first protrusion 34 is provided with an opening 47 provided in the surface opposed to the resin portion 33 and a screw hole 48 extending from the opening 47 to pass through the boss 46 of the first protrusion 34 in the thickness direction T. The surface 44 of the first protrusion 34, which is opposed to the resin portion 33, is provided with a concave portion 51, for example, having a depth of approximately 0.1 mm for arrangement of the block 36. The block 36 is fitted in the concave portion 51.

As shown in FIG. 6, the second protrusion 35 is integral with the metallic portion 32, and is a small piece protruding toward the resin portion 33. The second protrusion 35 is arranged on the resin portion 33 in the thickness direction T of the resin portion 33. The second protrusion 35 is not provided with the boss 46 or screw hole 48. As shown in FIG. 2, the first protrusions 34 and the second protrusions 35 are alternately provided at regular intervals in a width direction W of the cover 31 orthogonal to an anteroposterior direction of the portable computer 11.

As shown in FIG. 5, the block 36 is interposed between the first protrusion 34 and the resin portion 33. The block 36 is an example of an interposed portion interposed between the first protrusion 34 and the resin portion 33. The block 36 is made of, for example, a heat-resistant tape having a thickness of approximately 0.1 mm. More specifically, the block 36 is a Kapton (registered trademark) tape, which is made by applying a silicone adhesive to one surface of a heat-resistant polyimide film. The block 36 covers the opening 47 of the first protrusion 34.

To manufacture the cover 31 of the portable computer 11 of the present embodiment, the metallic portion 32, first protrusion 34 and second protrusion 35 are integrally formed in advance by die-casting. Then, as shown in FIG. 5, a pilot hole passing through the boss 46 of the first protrusion 34 in the thickness direction T is formed, and the screw hole 48 (female thread) is formed along the pilot hole using a tap (not shown).

Since the screw hole 48 passes through the first protrusion 34 in the thickness direction T, a screw thread can be formed on the entire inner surface of the screw hole 48. Then, a heat-resistant tape, which is the block 36, is made to adhere to the surface 44 opposed to the resin portion 33 of the first protrusion 34 to cover the opening 47 in the surface 44. The metallic portion 32, first protrusion 34, second protrusion 35 and block 36 integrated into one body are located as an insert in a die for injection molding. In this state, injection molding is performed to form the resin portion 33 integrated with the metallic portion 32. Since the opening 47 is covered by the block 36, synthetic resin never enters the screw hole 48. Further, since the block 36 is hidden under the resin portion 33, provision of the block 36 does not spoil the appearance of the portable computer 11.

According to the first embodiment, the portable computer 11 comprises the first case in which the screw hole 48 is provided, the second case separated from the first case, and the screw 25 which passes through the screw hole 48 to fix the second case to the first case; the first case comprises the metallic portion 32 in which the opening portion 32A is provided, the resin portion 33 formed integrally with the metallic portion 32 to cover the opening portion 32A, the protrusion extending from the metallic portion 32 to be arranged on the resin portion 33 in the thickness direction, and the block 36 located between the protrusion and the resin portion 33; the protrusion is provided with the opening 47 formed in the surface 44 opposed to the resin portion 33 and the screw hole 48 extending from the opening 47 and passing through the protrusion in the thickness direction T; and the block 36 covers the opening 47.

Generally, when a screw hole (female thread) having a bottom is formed by means of a tap, the female thread cannot be formed in an area within, for example, approximately 0.6 mm of the bottom of a pilot hole because of the structure of the tap. This is because the female screw cannot be formed in the vicinity of the tip of the tap. Moreover, when a screw hole having a bottom is formed, the thickness of a bottom part needs to be at least, for example, 0.6 mm or thereabouts in consideration of, for example, tolerance of the pilot hole. Therefore, in the case of a general screw having a bottom, a dimensional loss of, for example, approximately 1.2 mm or more is produced by combination of the above causes.

Since the screw hole 48 is formed to pass through the protrusion in the above structure, the effective length of the screw, which is the length of the area in the screw hole 48 where a female thread is actually formed, is equal to the entire length of the screw hole 48. Accordingly, the entire length of the screw hole 48 can be reduced, and the thickness of the first case can be reduced. Further, since the bottom part of the screw hole 48 need not be provided, the thickness of the first case can be further reduced by the thickness of the bottom part. Consequently, the thickness of the portable computer 11 can be further reduced.

In addition, since the opening 47 is covered by the block 36, it is possible to prevent a resin from entering the screw hole 48 and filling the screw hole 48 when the resin portion 33 is formed integrally with the metallic portion 32. Further, since the block 36 takes a sheet form, the thickness of the first case is not increased by provision of the block 36. In particular, if a sheet having a thickness of, for example, 0.1 mm or thereabouts is used as the block 36, the thickness of the first case can be reduced by, for example, at least 1.1 mm or thereabouts. Consequently, the thickness of the portable computer 11 can be reduced by that length.

In this case, the metallic portion 32 is provided with the concave portion 51 in which the block 36 is fitted. This structure can prevent the thickness of the resin portion 33 from being thinner by provision of the block 36. Consequently, the fluidity of the resin at the time of injection molding is improved, and the frequency of producing a defective resin portion 33 can be reduced. As a result, the yield of the first case can be improved.

The resin portion 33 comprises the first holders 42 which surround and hold the end part of the protrusion. This structure can improve the strength around the resin portion 33. Consequently, even if the thickness of the first case is further reduced, it is possible to prevent the strength around the resin portion 33 from being reduced.

In this case, the portable computer 11 comprises the main body 12 provided separately from the first case and second case and rotatably supporting the first case and second case, and the cushions 24 which are fixed to the second case at positions corresponding to the heads 25A of the screws 25 and strikes the main body 12 when the second case is rotated to be opposed to the main body 12. Since the cushions 24 are provided in correspondence with the heads 25A of the screws 25 in this structure, the second case can be prevented from striking hard against the main body 12. Further, the heads 25A of the screws 25 can be hidden under the cushions 24, and good appearance of the portable computer 11 can be maintained. Therefore, it is preferable to provide the cushions 24 to the portable computer 11.

Figure 7:
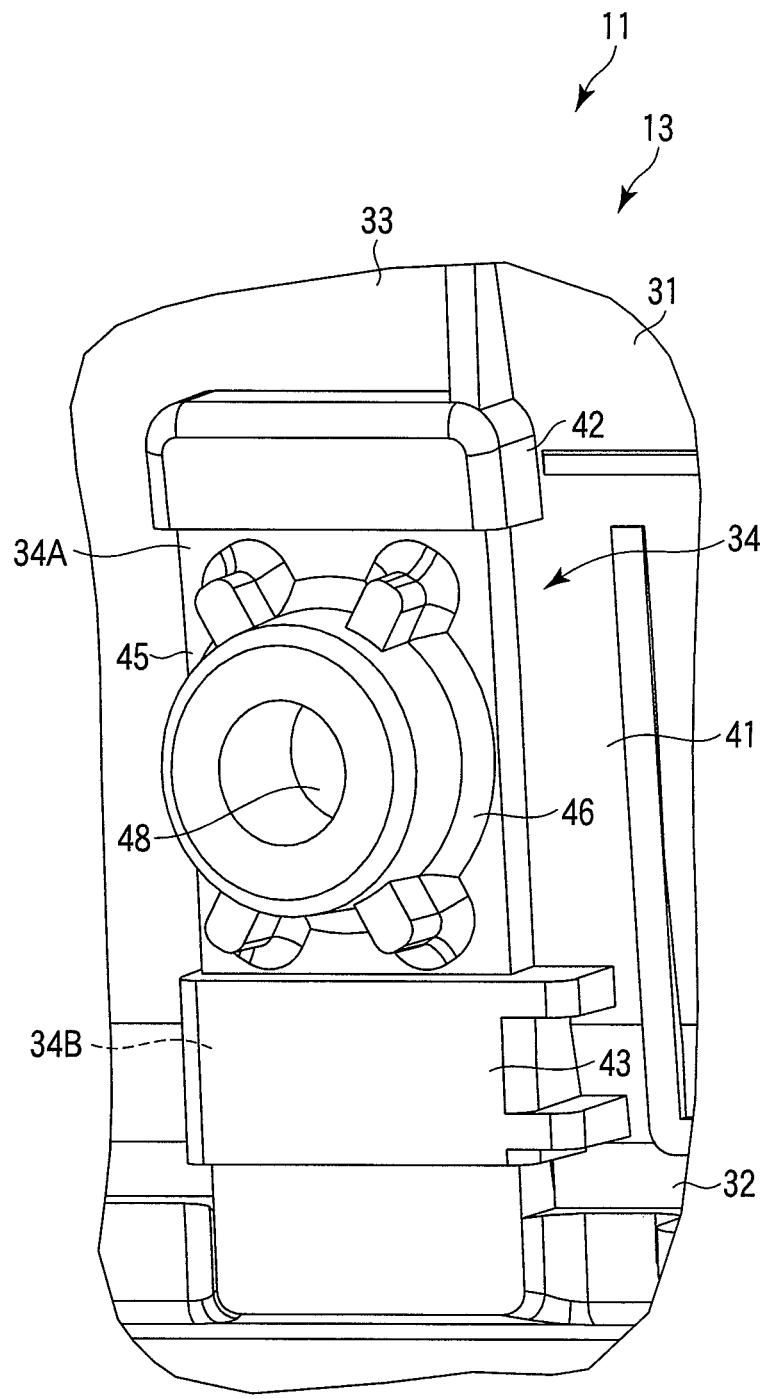
FIG. 7 is an exemplary enlarged perspective view of the vicinity of a first protrusion of a cover of a portable computer which is an example of an electronic apparatus of a second embodiment.

Next, referring to FIG. 7, a second embodiment of the electronic apparatus will be described. The portable computer 11 which is an example of the electronic apparatus of the second embodiment is different from that of the first embodiment in that the first holder 42 and the second holder 43 are provided in correspondence with the first protrusion 34. However, the other elements are the same as those of the first embodiment. Therefore, different elements will mainly be explained, and the same elements will be assigned the same reference symbols, and the explanations thereof will be omitted. The portable computer 11 of the second embodiment has the same appearance as that shown in FIG. 1.

The resin portion 33 comprises a main portion 41, a plurality of first holders 42 protruding from the main portion 41, and a plurality of second holders 43 protruding from the main portion 41. Each first holder 42 surrounds the first end 34A of the first protrusion 34 or the second end 35A of the second protrusion 35. Each first protrusion 42 forms a bag shape together with the main portion 41. Each second holder 43 surrounds the vicinity of the second base 34B opposite to the first end 34A of the first protrusion 34, or surrounds the vicinity of the second base 35B opposite to the second end 35A of the second protrusion 35. Each second protrusion 43 forms a tubular shape together with the main portion 41.

In this second embodiment, the first protrusion 42 and the second protrusion 43 are provided in correspondence with the first protrusion 34. Between the first holder 42 and the second holder 43, the boss 46 and screw hole 48 of the first protrusion 34 are provided.

In the second embodiment, the protrusion comprises the base portion opposite to the end portion, and the resin portion 33 comprises the second holder 43 surrounding and holding the base portion. Since the second holder 43 is provided in addition to the first holder 42 in this structure, the strength of the resin portion 33 around the first protrusion 34 can be further improved. Even if the thickness of the portable computer 11 is further reduced, the strength of the first case of the resin portion 33 can be prevented from being reduced.

Figure 8:
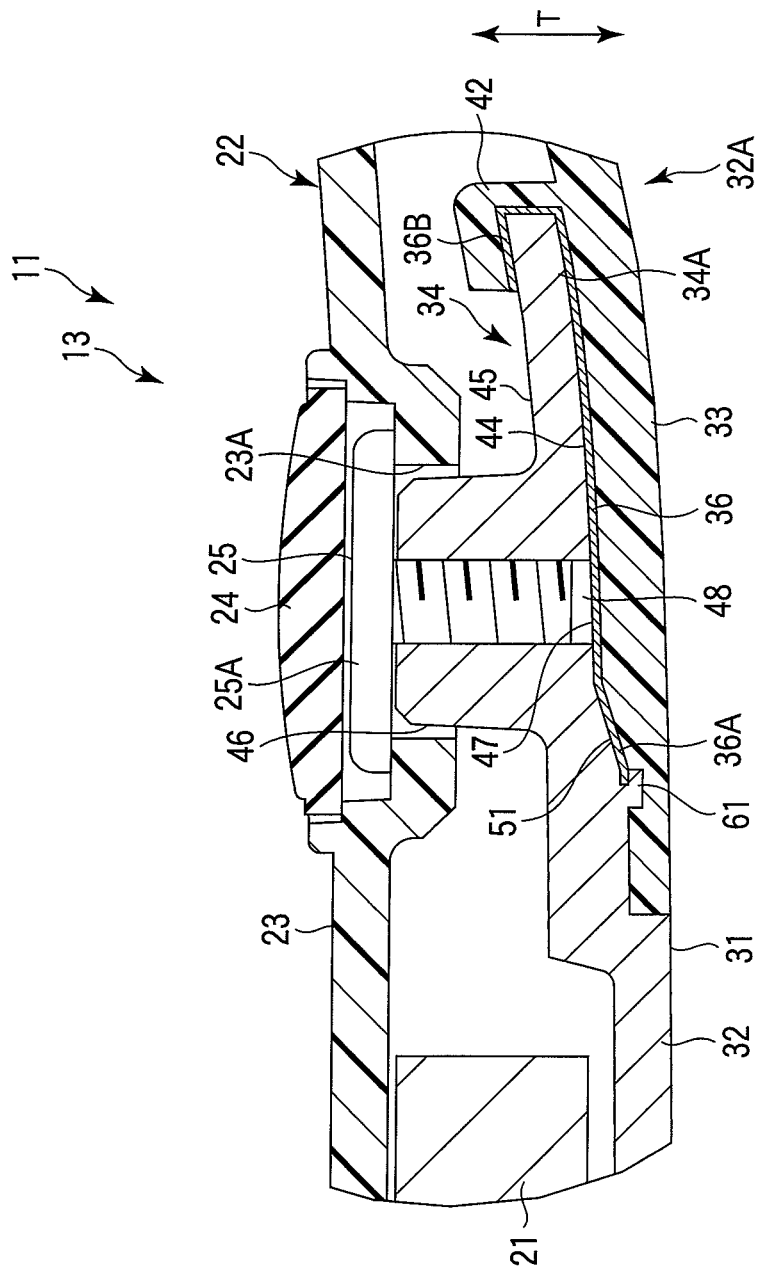
FIG. 8 is an exemplary cross-sectional view taken in a thickness direction of a cover and mask of a portable computer which is an example of an electronic apparatus of a third embodiment.
Figure 9:
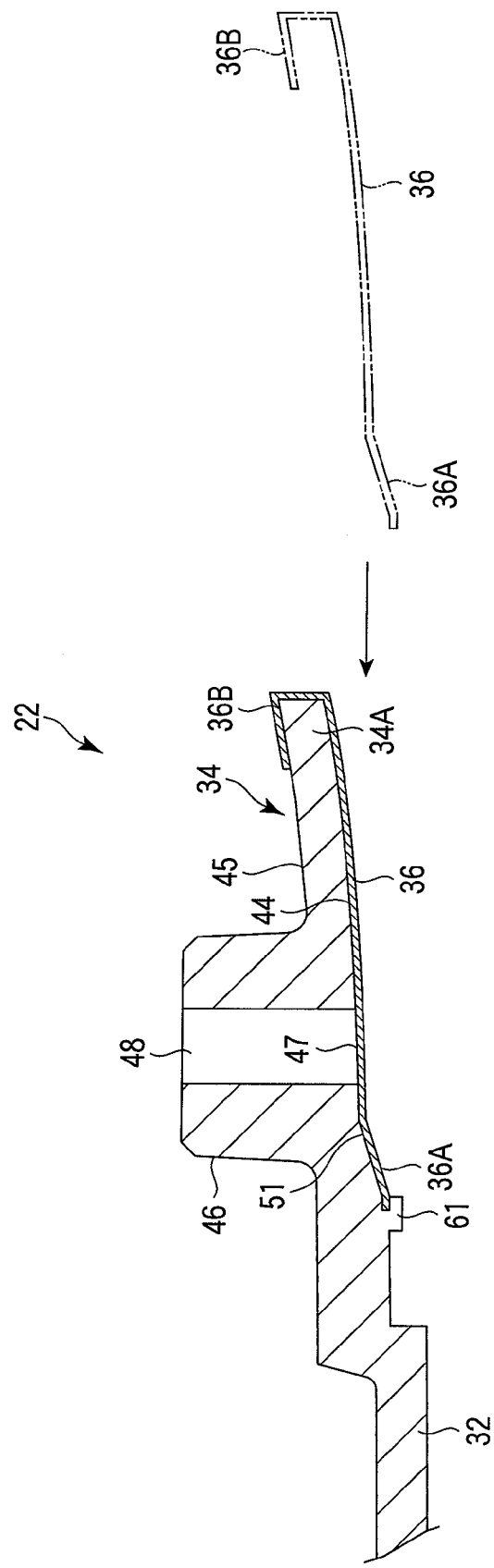
FIG. 9 is an exemplary cross-sectional view showing part of a step for manufacturing the cover of the portable computer shown in FIG. 8.

Referring to FIGS. 8 and 9, we will explain a third embodiment of the electronic apparatus. The portable computer 11 which is an example of the electronic apparatus of the third embodiment is different from that of the first embodiment in terms of the forms of the first protrusion 34 and block 36. However, the other elements are the same as those of the first embodiment. Therefore, different elements will mainly be explained, and the same elements will be assigned the same reference symbols, and the explanations thereof will be omitted. The portable computer 11 of the third embodiment has the same appearance as that shown in FIG. 1.

As shown in FIG. 8, the first protrusion 34 is integrated with the metallic portion 32, and is a small piece protruding toward the resin portion 33. The first protrusion 34 comprises the boss 46 on the surface 45 opposite to the surface 44 opposed to the resin portion 33. The first protrusion 34 is provided with the opening 47 provided in the surface 44 opposed to the resin portion 33, and the screw hole 48 extending from the opening 47 and passing through the boss 46 of the first protrusion 34 in the thickness direction T. The surface 44 opposed to the resin portion 33 of the first protrusion 34 is provided with a concave portion 51 having a depth of, for example, approximately 0.1 mm for disposition of the block 36. The block 36 is fitted in the concave portion 51.

The first protrusion 34 comprises an insertion portion 61 having a hook-shaped cross section, in which a first end 36A of the block 36, which will be mentioned later, is inserted. The insertion portion 61 can hold therein the first end 36A of the block 36.

As shown in FIG. 9, the block 36 is formed by bending a sheet-like metallic plate having a thickness of, for example, approximately 0.1 mm. More specifically, the block 36 is made by bending an aluminum plate by sheet metal processing. The composition of the aluminum plate is, for example, pure aluminum. Instead of pure aluminum, various aluminum alloys may be used.

The block 36 comprises a first end 36A and a second end 36B opposite to the first end 36A. The second end 36B is bent, for example, to form a U-shape along the first end 34A of the first protrusion 34. The block 36 covers the opening 47 of the first protrusion 34.

To manufacture the cover 31 of the portable computer 11 of the present embodiment, the metallic portion 32, first protrusion 34 and second protrusion 35 are integrally formed in advance by die casting. Then, as shown in FIG. 8, a pilot hole passing through the boss 46 of the first protrusion 34 in the thickness direction T is formed, and the screw hole 48 (female thread) is formed along the pilot hole using a tap (not shown). At this time, the thread is formed on the entire inner surface of the screw hole 48. The aluminum plate, which is the block 36, is subjected to bending work in advance to have a U-shaped cross section as indicated by a chain double-dashed line in FIG. 9. The aluminum plate is mounted on the surface 44 opposed to the resin portion 33 of the first protrusion 34 to cover the opening 47 in the surface 44. At the same time as inserting the first end 36A of the block 36 into the insertion portion 61, the second end 36B of the block 36 is inserted into the first end 34A of the first protrusion 34, whereby the block 36 is fixed to the first protrusion 34. Further, the metallic portion 32, first protrusion 34, second protrusion 35 and block 36 integrated into one body are located as an insert in a die for injection molding. In this state, injection molding is performed to form the resin portion 33 integrated with the metallic portion 32. Since the opening 47 is blocked by the aluminum plate, which is the block 36, synthetic resin never enters the screw hole 48.

In the third embodiment, since the block 36 is made of an aluminum plate, the costs for manufacturing the block 36 can be reduced in comparison with the first embodiment in which an expensive heat-resistant tape (Kapton [registered trademark] tape) is used.

The electronic apparatus is not limited to the portable computer 11 described in the above embodiments, and may be another electronic apparatus such as a mobile phone. The electronic apparatus may be variously modified within the spirit of the invention at the stage of implementation. Further, the invention is variously embodied by appropriately combining a plurality of structural elements disclosed in the above descriptions of embodiments. For example, some structural elements may be omitted from all the structural elements disclosed in the above descriptions of embodiments. Moreover, structural elements in different embodiments may be combined where necessary.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
a first case comprising a screw hole;
a second case separate from the first case; and
a screw inserted in the screw hole to fix the second case to the first case, wherein the first case comprises:
a metallic portion comprising an opening portion;
a resin portion integral with the metallic portion and configured to cover the opening portion;
a protrusion on the resin portion and extending from the metallic portion in a thickness direction; and
a sheet-type block between the protrusion and resin portion,
wherein the protrusion comprises an opening in a surface opposite to the resin portion,
wherein the screw hole is extending from the opening in the thickness direction through the protrusion, and
wherein the block is on the opening.

2. The electronic apparatus of claim 1, wherein the metallic portion comprises a concave portion comprising the block therein.

3. The electronic apparatus of claim 2, wherein the resin portion comprises a first holder surrounding an end portion of the protrusion and configured to hold the end portion of the protrusion.

4. The electronic apparatus of claim 3, wherein the protrusion comprises a base portion opposite to the end portion, and the resin portion comprises a second holder surrounding the base portion and configured to hold the base portion.

5. The electronic apparatus of claim 4, comprising:
a main body separate from the first case and the second case and rotatably supporting the first case and the second case; and
a cushion attached to the second case at a position corresponding to a head of the screw, the cushion being in contact with the main body when the second case is rotated opposite to the main body.

6. An electronic apparatus, comprising:
a first case comprising a screw hole;
a second case separate from the first case; and
a screw passing through the screw hole to fix the second case to the first case, wherein the first case comprises:
a metallic portion;
a resin portion integrated with the metallic portion;
a protrusion on the resin portion and extending from the metallic portion in a thickness direction; and
an interposed portion between the protrusion and the resin portion,
wherein the protrusion comprises an opening in a surface opposite to the resin portion, and
wherein the screw hole is extending from the opening in the thickness direction through the protrusion, and
the interposed portion is on the opening.

7. The electronic apparatus of claim 6, wherein the metallic portion comprises a concave portion comprising the interposed portion therein.

8. The electronic apparatus of claim 7, wherein the resin portion comprises a first holder surrounding an end portion of the protrusion and configured to hold the end portion of the protrusion.

9. The electronic apparatus of claim 8, wherein the protrusion comprises a base portion opposite to the end portion, and the resin portion comprises a second holder surrounding the base portion and configured to hold the base portion.

10. The electronic apparatus of claim 9, comprising:
a main body separate from the first case and the second case and rotatably supporting the first case and the second case; and
a cushion attached to the second case at a position corresponding to a head of the screw, the cushion being in contact with the main body when the second case is rotated opposite to the main body.

* * * * *